United States Patent Office 3,415,767
Patented Dec. 10, 1968

3,415,767
PLASTICIZER COMPOSITIONS FOR NEOPRENE FILMS
Andrew J. Kelly, West Roxbury, Mass., assignor to W. R. Grace & Co., Cambridge, Mass., a corporation of Connecticut
No Drawing. Filed Sept. 27, 1965, Ser. No. 490,684
4 Claims. (Cl. 260—27)

ABSTRACT OF THE DISCLOSURE

Elongation properties and low temperature characteristics of neoprene meteorological balloons are improved by using a plasticizer composed of butyl tallate alone or in admixture with compounds derived from 18 carbon monocarboxylic fatty acids, such as lower alkyl oleates and nitriles.

---

This invention relates to plasticizer compositions useful for treating hollow articles made from neoprene. More particularly, the present invention relates to plasticizer compositions useful for improving the low temperature characteristics of meteorological balloons.

While various types of balloons are employed in weather studies, the mainstay of modern meteorology is the sounding balloon. These balloons are designed to carry aloft a radiosonde, rawinsonde or other instrument group to determine humidity and temperature at various altitudes and depending upon the instrument used, to determine wind direction and wind velocity as well. Such balloons are necessarily quite large and during ascent expand to at least three times their launching diameter.

Though sounding balloons have been made from natural rubber, balloons made from neoprene have exhibited better performance in most respects. However, at very low ambient temperatures, such as those encountered in the tropopause during nighttime flights, neoprene film tends to freeze so that it becomes stiff and brittle and thus, is incapable of expansion. As a result, the bursting altitude of the balloon is considerably lower during hours of darkness than the bursting altitude achieved by similar balloons during daytime flights. For this reason, it is common practice in modern balloon manufacture to post-plasticize the neoprene envelope of sounding balloons to reduce the brittle point temperature of the film so that better high altitude performance can be obtained during nighttime flights.

In conventional post-plasticizing procedures, the balloon after being cured is evacuated and immersed in a bath of plasticizer solution until the requisite amount of plasticizer has been absorbed by the film. The balloon is then withdrawn from the bath, drained of excess plasticizer, inflated and dried at room temperature. Among the plasticizers commonly used in this procedure are dialkyl phthalates, e.g., dibutyl and dioctyl phthalate; dialkyl esters of alkane dicarboxylic acids, e.g., dioctyl adipate and dibutyl sebacate; and alkylene glycol derivatives, e.g., triethylene glycol di(2-ethylhexoate), dipropylene glycol dibenzoate, and ethylene glycol monobutyl ether oleate. The diluent used with the plasticizer in making the plasticizer solution may be ethyl alcohol, isopropyl alcohol, butyl alcohol, acetone or other volatile organic liquid which is a solvent for the particular plasticizer employed but a non-solvent for cured neoprene.

Though the plasticizers currently used to treat neoprene balloons impart some improvement in low temperature characteristics, the performance of the plasticized balloons has not been entirely satisfactory. Elongation of the film at the extremely low temperatures existing at high altitudes during darkness is not always sufficient to give bursting altitudes comparable to the altitudes attained in daytime flights. Further, the balloons do not exhibit the consistency in high altitude performance which is in demand today.

According to the present invention, a plasticizer composition is provided which allows neoprene films to retain exceptionally high elongation at the very low ambient temperatures encountered in the tropopause in nighttime flights. More specifically, the present invention provides a composition for plasticizing cured neoprene films which comprises a member of the group consisting of (a) butyl tallate and (b) butyl tallate in admixture with a compound derived from an 18-carbon monocarboxylic fatty acid, said member being dissolved in a volatile organic liquid which is a non-solvent for cured neoprene.

Besides improving the elongation ratio of the balloon film at temperatures in the neighborhood of −80° to −90° C., butyl tallate and its blends with certain fatty acid compounds greatly enhance low temperature flexibility without impairing the strength of the film. As a result, balloons treated with butyl tallate compositions exhibit better resistance to excessive stiffening or freezing at minimum tropopause temperatures so that optimum bursting altitudes are attained in nighttime flights with far greater consistency than ever before. Moreover, butyl tallate and its blends have been found more effective in plasticizing neoprene balloon films than the plasticizers currently used. Thus, considerable improvement in low temperature characteristics can be achieved at lower plasticizer concentrations.

In improving the low temperature characteristics of neoprene films, butyl tallate may be used alone and in blends with certain other compounds. The compounds found most suitable for this purpose are derived from 18 carbon monocarboxylic fatty acids and preferably, from 18-carbon unsaturated monocarboxylic fatty acids, such as oleates, e.g. butyl oleate and other lower alkyl oleates, ethylene glycol monoalkyl ether oleates, e.g., ethylene glycol monobutyl ether oleate; oleyl nitrile; and a mixture of fatty acid nitriles containing a predominant amount of oleyl nitrile and a minor amount of other fatty acid nitriles, such as stearyl nitrile and linoleyl nitrile.

In carrying out the present invention, the plasticizer composition is prepared by dissolving butyl tallate or a blend of butyl tallate with a fatty acid compound or mixture of fatty acid compounds in a volatile organic liquid. For this purpose, any volatile organic liquid may be employed which is a solvent for the butyl tallate or butyl tallate blend provided that it is a non-solvent for cured neoprene and has a boiling point below that of the plasticizer. Typical solvents for butyl tallate and its blends include aliphatic alcohols, e.g., ethyl alcohol and isopropyl alcohol; ketones, e.g., acetone; and esters, e.g., amyl acetate.

The proportions of ingredients in the plasticizer solution may vary over a relatively wide range. When a fatty acid compound is used in admixture with butyl tallate to form the plasticizer component, it may be used in amounts up to 90% by weight and preferably, is used in amounts up to about 70% by weight as based on the total quantity of plasticizer employed. Above 90% by weight of fatty acid compound, the blend tends to decrease in plasticizing efficiency.

The concentration of plasticizer in solution, whether butyl tallate alone or a butyl tallate blend, may also vary widely, and in general, ranges between about 20 and 85% by weight. Below about 20% by weight of plasticizer, the solution is too dilute to obtain absorption of plasticizer at the levels required for effective freeze resistance. Above about 85% by weight plasticizer, the film tends to absorb an excessive quantity of plasticizer which results in a reduction in film strength.

Post-plasticizing of cured neoprene balloons with the compositions of the present invention is carried out in a conventional manner by evacuating a balloon, immersing the deflated balloon in a bath of the plasticizer solution, allowing the balloon to dwell for a time sufficient to absorb the requisite amount of plasticizer, withdrawing and draining the balloon to remove excess plasticizer, inflating the balloon and air-drying the inflated balloon to remove residual solvent from the film.

The plasticizer level in the balloon film may range between about 15 and 55 parts by weight plasticizer per 100 parts by weight of neoprene, and preferably, the level of plasticizer varies between about 25 and 50 parts by weight as based on 100 parts by weight of neoprene. At least 15 parts by weight plasticizer is necessary to obtain balloon films exhibiting good elongation at very low temperatures while above about 55 parts by weight, the strength of the film tends to decrease.

The balloons treated according to the present invention may be any of those commonly used in the art including neoprene films modified with fillers, antioxidants, antiozonants, curing agents, curing accelerators or other conventional compounding ingredients. While the compositions of the present invention are especially useful in treating meteorological balloons, it will be understood that these compositions may also be used for plasticizing other neoprene articles, such as, soil sample membranes, thin-walled tubing and breathing bags.

The following example is given to illustrate the invention more clearly. All quantities given are in parts by weight unless specified otherwise.

EXAMPLE

To compare the low temperature properties of balloon films post-plasticized with butyl tallate and its blends with films post-plasticized with a conventional plasticizer, a batch of neoprene sounding balloons was divided into four groups, A–D. Group A was post-plasticized with ethylene glycol monobutyl ether oleate, a plasticizer commonly used for treating meteorological balloons, while the other three groups of balloons were post-plasticized with compositions of the present invention.

The balloons treated were prepared in a conventional manner by immersing a coagulant-coated mold in a bath of an aqueous dispersion of neoprene for the time necessary to build up a layer of rubber gel of the desired thickness and then withdrawn. The mold carrying the deposit of rubber gel was then soaked in water for a short time to leach out excess coagulant. After soaking and before the gel had dried to any appreciable extent, the gel was stripped from the mold, coated with talc, inflated to about four and one-half times its original diameter and dried at room temperature while inflated. After drying, the balloon was deflated and placed in an oven maintained at 240° F. for about four hours to cure.

The balloons had a flaccid length of about 90 inches, a film thickness of about 4 mils and weighed about 900 grams each before post-plasticizing. The composition of the cured balloon films in parts by weight was 100 parts neoprene, 6 parts of a curing mixture consisting of 5 parts zinc oxide and 1 part of a dithiocarbamate curing accelerator, 3 parts antiozonant, 2 parts antioxidant and 0.5 part of a stabilizer for the neoprene.

Each group of balloons was post-plasticized using the same procedure which comprised evacuating the balloons in each group, immersing them in a bath of plasticizer solution until the desired level of plasticizer was absorbed by the film, draining excess plasticizer from the films, inflating the balloons to their flaccid diameter and air drying the balloons while they were inflated.

(A) The balloons in Group A were post-plasticized to a level of 61 parts by weight plasticizer per 100 parts by weight neoprene with a solution of ethylene glycol monobutyl ether oleate in isopropyl alcohol. The concentration of plasticizer in solution was 75% by weight.

(B) The balloons in Group B were post-plasticized to a level of 54 parts by weight plasticizer per 100 parts by weight neoprene with a solution of butyl tallate dissolved isopropyl alcohol. The concentration of butyl tallate in solution was 75% by weight.

(C) The balloons in Group C were post-plasticized to a level of 54 parts by weight plasticizer per 100 parts by weight neoprene with a 2:1 blend of butyl tallate and butyl oleate dissolved in isopropyl alcohol. The total concentration of plasticizer in solution was 75% by weight.

(D) The balloons in Group D were post-plasticized to a level of 50 parts by weight plasticizer per 100 parts by weight neoprene with a 1:1:1 blend composed of (a) butyl tallate, (b) butyl oleate and (c) "Arneel OD," a mixture of fatty acid nitriles consisting of about 91% by weight oleyl nitrile, 6% by weight stearyl nitrile and 3% by weight linoleyl nitrile. The total concentration of plasticizer in solution was 75% by weight.

After post-plasticizing, the ultimate elongation of the balloon films at very low temperatures was determined according to the procedure set forth in the Journal of Research of the National Bureau of Standards, 53 (6), 383–392 (December 1954). The design of the patch tester employed was based on that of the tester described in the above publication.

Two circular patches measuring about 3 inches in diameter were cut and tested for each balloon. Each patch was secured around its circumference with a clamping ring having an opening measuring 2.5 inches in diameter, and then the patch was inflated until it burst. The major diameter of the patch at burst was measured by means of two diametrically opposed, freely movable rods which were moved apart by the expanding patch. The distance between the rods was recorded after burst.

Inflation of each patch of film was conducted in a cold box using moisture-free air as the inflating gas. The temperature of the atmosphere surrounding the film was maintained at $-85°$ C. throughout the test, and the volume rate of inflation was kept constant at 10 cubic inches of air per minute.

Ultimate elongation as defined in this test is the ratio of the final to the initial length of a line drawn on the film. The value for ultimate elongation ($E_B$) is calculated from the equation $E_B = 1.04\, De$ where $De$ is the equatorial diameter of the patch at burst.

The patches tested from the balloons in Group A, which were post-plasticized with a conventional plasticizer, showed excessive stiffening under the extreme conditions employed and did not form the usual bubble configuration. In fact, the patches burst before any significant expansion of the films had occurred.

In comparison, the patches tested from the balloons in Group B, which were post-plasticized with butyl tallate, formed comparatively large bubbles showing excellent elongation at an average value of 4.7 though the plasticizer level was less than that used for the balloons in Group A. The patches from the balloons in Groups C and D, which were post-plasticized with butyl tallate blends, also showed excellent elongation at very low temperatures. The average value for ultimate elongation for the ballons in Groups C and D were 4.4 and 3.2, respectively.

From the results obtained, the efficacy of butyl tallate and butyl tallate blends as plasticizers for cured neoprene films is readily apparent. The balloon films post-plasticized with these compositions gave elongation ratios far exceeding the control which showed substantially no elongation under the rigorous test conditions employed. As indicated by these results, superior flight performance at extremely low temperatures can be obtained with balloons treated with the plasticizers of the present invention.

I claim:
1. A meteorological balloon comprising a neoprene envelope plasticized with 15 to 55 parts by weight per 100 parts by weight of neoprene of a member selected from the group consisting of (a) butyl tallate and (b) butyl tallate in admixture with at least one compound derived from an 18-carbon monocarboxylic fatty acid, the compound being selected from the group consisting of (1) a lower alkyl ester, (2) an ester of an ethylene glycol monoalkyl ether, (3) a nitrile, and (4) a mixture of nitriles.
2. A meterological balloon according to claim 1 wherein said member is butyl tallate.
3. A meteorological balloon according to claim 1 wherein said member is a 2:1 mixture of butyl tallate and butyl oleate.
4. A meteorological balloon according to claim 1 wherein said member is a 1:1:1 mixture of (1) butyl tallate, (2) butyl oleate, and (3) a mixture of fatty acid nitriles consisting of 91% by weight oleyl nitrile, 6% by weight stearyl nitrile and 3% by weight linoleyl nitrile.

References Cited

UNITED STATES PATENTS

| 2,373,979 | 4/1945 | Segessemann | 260—97.5 |
| 2,498,532 | 2/1950 | Dean | 260—31.8 |
| 2,734,884 | 2/1956 | Smith et al. | 260—31.8 |

OTHER REFERENCES

Buttrey, "Plasticizers," Franklin Pub. Co., Palisades, N.J. (1960), p. 193.

Harbor et al., Ind. Eng. Chem., 37 953–956 (1945).

Murray et al., "The Neoprenes," Du Pont (1963), p. 40.

ALLAN LIBERMAN, *Primary Examiner.*

H. H. FLETCHER, *Assistant Examiner.*

U.S. Cl. X.R.

106—316; 260—31.2, 31.4, 32.4, 97.5; 244—31